J. R. LISTON.
WIND WHEEL.
APPLICATION FILED JULY 21, 1910.

1,015,695.

Patented Jan. 23, 1912.
3 SHEETS—SHEET 2.

J. R. LISTON.
WIND WHEEL.
APPLICATION FILED JULY 21, 1910.

1,015,695.

Patented Jan. 23, 1912.
3 SHEETS—SHEET 3.

James R. Liston, INVENTOR,

WITNESSES
Howard D. Orr.
R. W. Bishop

BY E. G. Siggers
ATTORNEY

UNITED STATES PATENT OFFICE.

JAMES R. LISTON, OF SAN DIEGO, CALIFORNIA, ASSIGNOR TO RALPH LISTON, OF SAN DIEGO, CALIFORNIA.

WIND-WHEEL.

1,015,695.  Specification of Letters Patent.  Patented Jan. 23, 1912.

Application filed July 21, 1910.  Serial No. 573,131.

*To all whom it may concern:*

Be it known that I, JAMES R. LISTON, a citizen of the United States, residing at San Diego, in the county of San Diego and State of California, have invented a new and useful Wind-Wheel, of which the following is a specification.

This invention relates to improvements in wind wheels, and has for its object the provision of a strong and durable wheel which will operate easily to transmit power derived from air currents and which will be of simple construction.

The invention seeks to provide a wind wheel which will be arranged to rotate in a horizontal plane and by which the wind may be cut off from the driving shaft in a simple and efficient manner, and in which access to the several parts may be easily had for the purpose of making repairs.

The several objects of the invention are attained in the use of the mechanism illustrated in the accompanying drawings, and the invention consists in certain novel features of the same which will be hereinafter first fully described and then more particularly pointed out in the appended claims.

Figure 1:
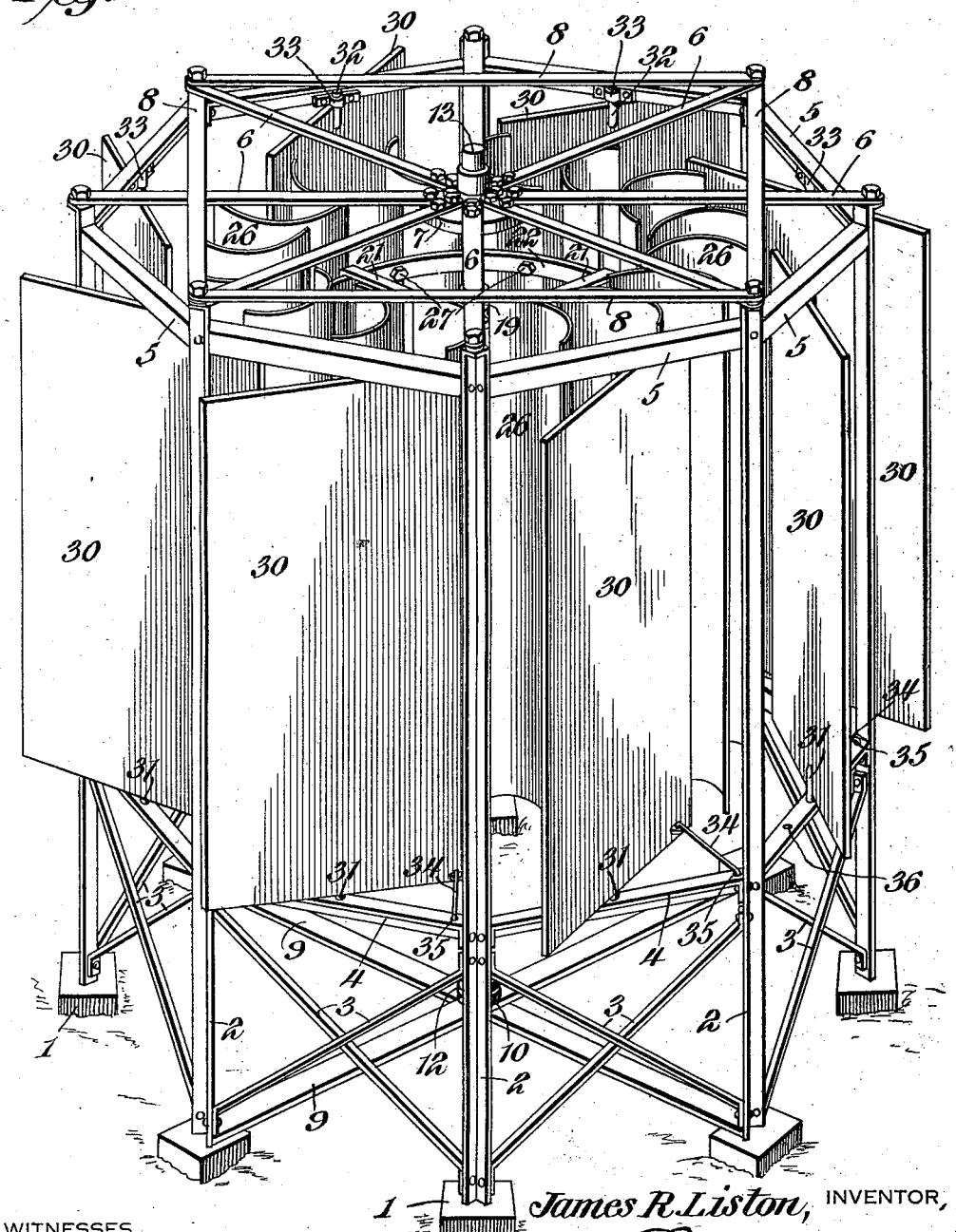
Figure 2:
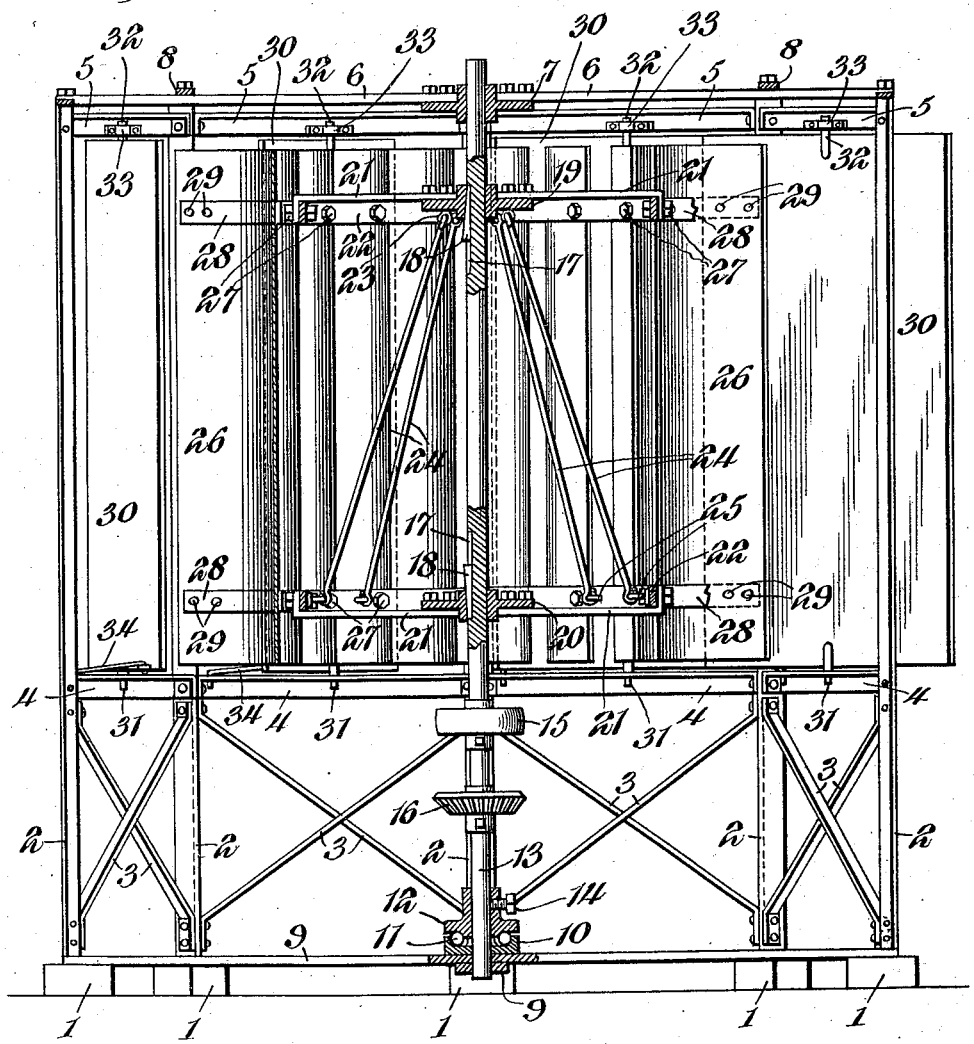
Figure 3:
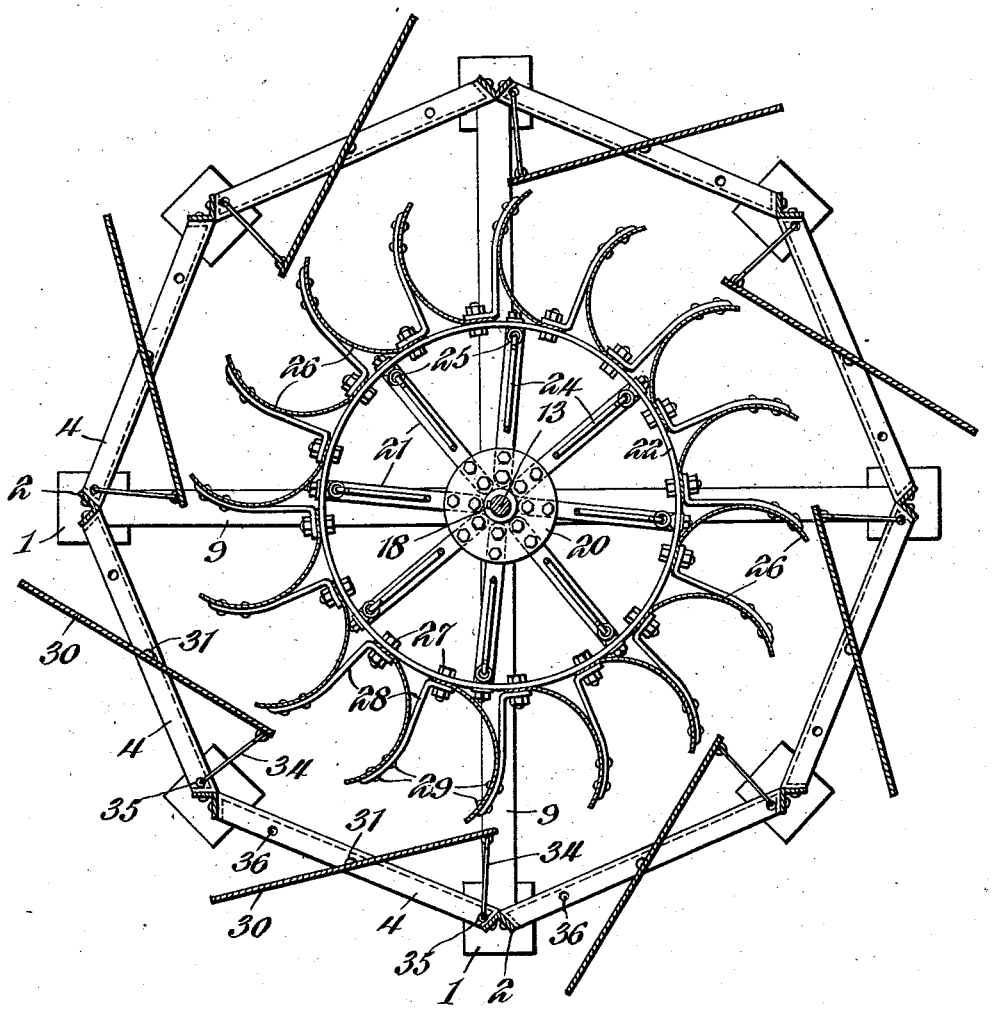

In the drawings,—Figure 1 is a perspective view of a wind wheel constructed in accordance with my invention. Fig. 2 is a vertical diametrical section of the same. Fig. 3 is a horizontal section taken through the several vanes and the shutters, between the ends of the same.

In carrying out my invention, I provide a plurality of bases 1 which may be of wood or concrete or other material adapted to furnish a strong and durable foundation. Upon these bases I erect a framework consisting of posts 2 constructed of angle irons and extended to the height desired for the structure. Between these posts, I arrange braces 3 which are secured to and extend obliquely between the adjacent posts. At a point above the upper ends of the braces I secure to the posts 2 horizontal bars 4 which constitute supports for the shutters as well as additional braces, for the posts. The upper ends of the posts are connected by similar bars 5, and braces or connecting arms 6 extend diametrically across the space defined by the posts and have their inner ends rigidly secured to a hub 7, as shown. I also employ additional braces 8 which connect some of the alternate posts at their upper ends so that a very rigid structure is provided which will not be overturned in heavy gales. Cross bars 9 are provided at the lower end of the frame and at the center of the device, where these bars intersect, a cup 10 is secured to receive a series of friction balls or rollers 11 upon which will rest a bearing flange 12 secured to the central driving shaft 13. This driving shaft 13 has its lower end extended through the cup 10 and the intersecting bars 9, while its upper end is rotatably fitted in the hub 7 at the upper end of the frame, as shown clearly in Fig. 2. The bearing flange 12 is adjustably secured to the driving shaft by a set screw 14 so that the shaft may be adjusted to maintain the vanes at the proper height and also to be carried by and rotate upon the balls 11, as will be readily understood. A band pulley 15 and a beveled gear 16 are secured upon the driving shaft below the plane of the horizontal bars 4 so that the power generated by the wind wheel may be transmitted in the most convenient manner to the machinery to be driven.

The driving shaft is provided with longitudinal grooves or keyways 17 in which are fitted wedge-shaped keys 18 adapted to bind hubs 19 and 20 to the driving shaft so as to positively transmit the motion of the vanes to the driving shaft and thence to the driven machinery, while at the same time, the parts may be easily disconnected when repairs to the same are necessary. It will be noted that the wedges are driven in opposite directions to secure their respective hubs to the driving shaft, and this arrangement is desirable for the reason that it tends to aid in preventing collapse of the structure by exerting a strong force upon the hubs which will maintain the braces extending between the upper and lower portion of the rotary member in a proper state of tension. Radial arms 21 are rigidly bolted to the hubs 19 and 20 and extend outward therefrom and have secured to their outer ends circular bands 22. A plurality of eye-bolts 23 are carried by the upper hub 19 and braces or links 24 have their upper ends engaged in the said eye-bolts and their lower ends engaged in similar eye-bolts 25 carried by the lower circular band 22 and arranged on the inner side of the said band, as will be most readily understood on reference to Fig. 2.

The construction just described provides a very rigid and strong support for the vanes 26 which are carried thereby and are secured to the outer sides of the circular bands. These vanes consist of vertically disposed plates of a concave form, in cross section, and are secured at their inner edges to the upper and lower bands 22 by bolts 27 which also serve to secure the inner ends of braces or straps 28. The outer end of each strap 28 is rigidly secured by rivets or similar fastenings 29 to the rear side of the vane 26 immediately in front of the brace near the outer edge of the said vane. It will thus be seen that the vanes are secured to the outer sides of the supporting bands so that the wind directed against the vanes will not be interrupted by braces or other devices and any one vane may be removed and repaired without requiring the dismantling of the entire rotary member. To remove any vane, it is necessary only to disconnect the inner end of the said vane from the supporting bands and the braces, which operation will be very simple and easily performed.

In order to control the access of the wind to the vanes, I provide a plurality of shutters 30 which are arranged between the posts 2 and the upper and lower horizontal bars 4 and 5 and are pivotally mounted in the said bars by means of pins 31 projecting from the middle or intermediate portion of their lower ends to engage suitable openings in the lower bars 4 and similar pins 32 projecting from the middle or intermediate portion of their upper ends to rotate in brackets or strap bearings 33 provided on the inner sides of the upper bars 5. To adjust these shutters to their open or closed position, I provide links 34 which are pivotally attached to the respective shutters near one lower corner of the same and have their free ends adapted to engage openings 35 in the bars 4 upon which their respective shutters are mounted, or similar openings 36 in the adjoining bar 4. When the links 34 are engaged in the openings 35 the shutters will be held in their open position, as shown in Fig. 3, but when it is desired to cut off the wind, the links are disengaged from the openings or sockets 35 and engaged in the sockets or openings 36, thereby drawing upon the end of the shutters so as to swing the same into a position substantially parallel with the sides of the bars 4 and 5 so that the space between the posts will be closed and the access of the wind to the vanes prevented.

It will be readily seen that in my device the rotary member will be actuated from whatever direction the wind may be blowing.

The horizontal bars 4 will ordinarily be arranged about eight feet above the ground so that there will be sufficient space below for the accommodation of the working parts and the transmitting gearing, and also to permit access of an attendant to lubricate the same and to reach the links 34 to adjust the shutters.

In my device, each shutter is a solid plate of a size sufficient to fill the space between two adjacent posts, and the frame will ordinarily be of an octagonal outline, as experience has demonstrated that eight shutters, arranged as I employ them, give the most satisfactory results both in cutting off the air from the vanes and also in permitting access of the air to the vanes. It will be observed that when the shutters are in the open position, the air currents directed by each shutter will strike the concavities of a plurality of vanes because the number of vanes is greater than the number of shutters, so that they will act upon the vanes in the most efficient manner to drive the rotary member and thereby generate the desired power. The vanes are secured rigidly to the supporting bands, and these bands in turn rigidly secured to the driving shaft so that the force of the air currents will rotate the driving shaft and thereby actuate the driven machinery, while the particular arrangement of the hubs and the links extending between the upper hub and the lower supporting band effectually prevent collapse of the rotary member under excessively strong currents.

My wind wheel is composed of few parts and is of an open construction so that access may be readily had to any part for the purpose of repairing or cleaning the same, and it is not necessary to dismantle and rebuild the wheel in order to repair any one part.

While I have described the principle of the invention, together with operation of the apparatus which I now consider to be the best embodiment thereof, I desire to have it understood that the apparatus shown is merely illustrative, and that such changes may be made when desired as are within the scope of the claims appended hereto.

Having thus described my invention, what I claim is:—

1. In a wind wheel, a main frame comprising a circular series of upright posts, upper and lower bars connecting the posts, each lower bar being provided with spaced openings, shutters having journal bearings in the upper and lower bars midway of the length thereof, each shutter being of a size to fill the space between two adjacent posts and having the journals intermediately located with respect to the sides of the shutter, and links connected to the lower end of each shutter and adapted to engage either of the openings in the lower horizontal bars on opposite sides of the post to which both bars are connected to hold the shutter in either an open or a closed position.

2. In a wind wheel, a main frame comprising a circular series of upright equally spaced posts and upper and lower bars connecting said posts, a shutter mounted in the upper and lower bars intermediate of the length thereof to turn upon an axis longitudinal of the shutter intermediate of the sides thereof, each shutter being of a size to fill the space between two adjacent posts, and a rotatable member within the circular series of posts and shutters carried thereby and provided with a circular series of upright vanes, said rotatable member being responsive to wind currents directed by the shutters, the shutters being movable to close the spaces between the adjacent posts and to open said spaces with one edge of each shutter closely adjacent to the path traversed by the outer edges of the vanes.

3. The combination of a vertical driving shaft, hubs secured thereto, circular bands supported from the said hubs, vanes arranged against the outer sides of the said bands, and braces having their outer ends secured to the outer portions of the vanes, the inner end of each brace being disposed upon the inner edge of the vane following the vane to which the brace is secured, and securing bolts inserted through the circular bands and the inner ends of the braces and the vanes against which the inner ends of the braces rest.

4. The wind wheel herein described and shown comprising a main frame consisting of vertical posts, braces secured to and extending between the said posts at and near the lower ends of the same, braces extending between the upper ends of the posts, a hub secured to the inner ends of the last mentioned braces, horizontal bars extending between the posts and each provided with an intermediate journal bearing and with sockets near the ends, shutters each having journal pins intermediately located in the respective ends, said shutters being mounted in the journal bearings in the said bars and adapted to close the space between the posts, intersecting bars extending between the lower ends of the post, a bearing supported by the said bars, a vertically disposed driving shaft having its lower end mounted in said bearing and its upper end mounted in the hub secured to the braces at the upper end of the frame, circular bands carried by the said driving shaft, and vanes secured to the outer sides of the said bands.

5. A wind wheel having a rotatable member provided with a circular series of vanes and responsive to wind currents, and a surrounding stationary series of wind directing shutters less in number than the vanes of the rotatable series and each shutter being independently adjustable about its central longitudinal axis.

6. A wind wheel having a rotatable member provided with a circular series of curved vanes presenting concaved surfaces to impelling wind currents, and a surrounding stationary series of independently adjustable wind directing shutters less in number than the number of vanes and each shutter controlling a plurality of vanes, the said shutters being each mounted to turn about its central longitudinal axis.

In testimony, that I claim the foregoing as my own, I have hereto affixed my signature in the presence of two witnesses.

JAMES R. LISTON.

Witnesses:
R. H. ANDERSON,
L. W. RICE.

---

Copies of this patent may be obtained for five cents each, by addressing the "Commissioner of Patents, Washington, D. C."